Sept. 26, 1961 R. SARDESON 3,001,305
PRESSING IRONS
Filed Jan. 12, 1959 3 Sheets-Sheet 1
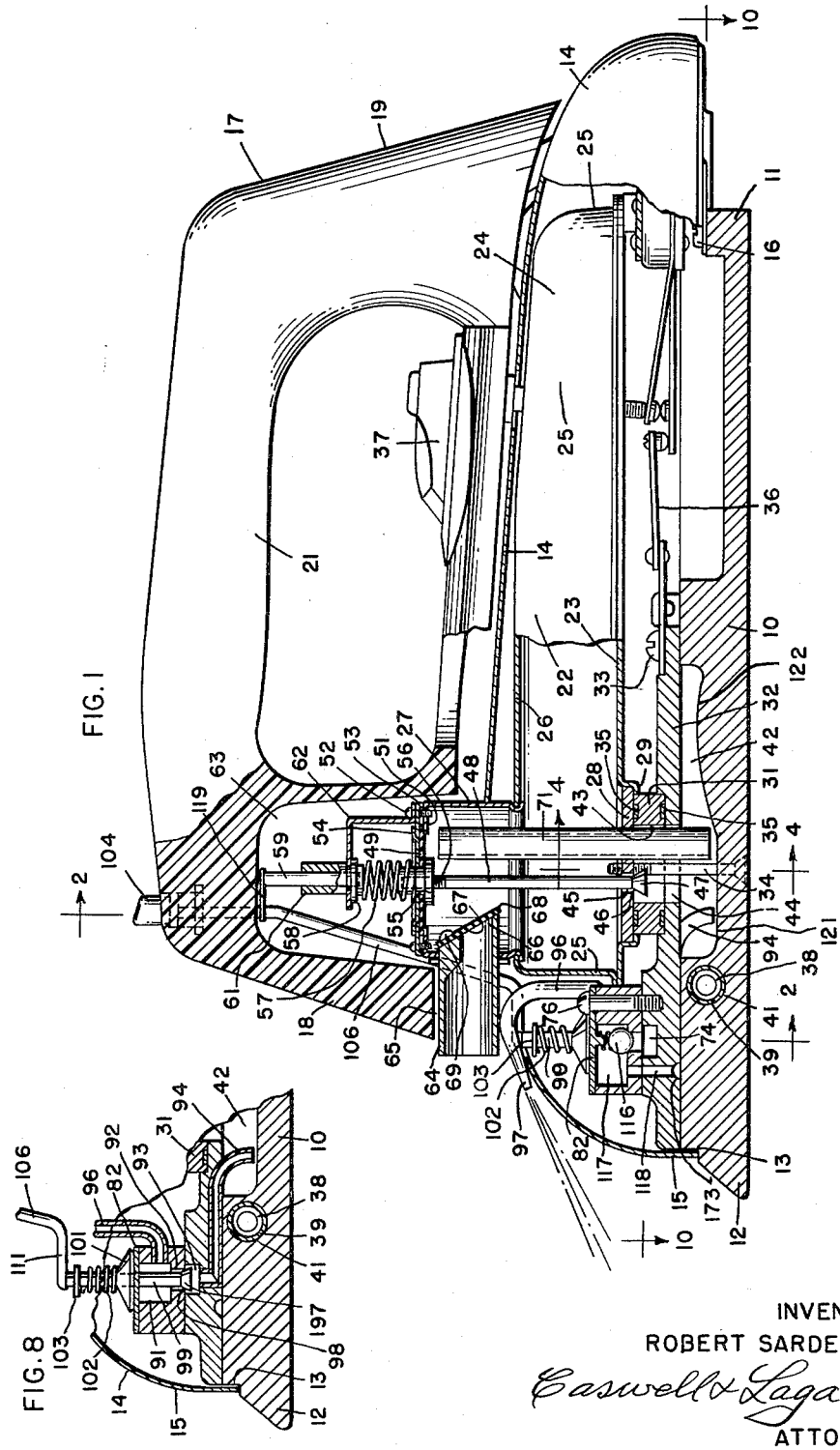
INVENTOR
ROBERT SARDESON
Caswell & Lagaard
ATTORNEYS Sept. 26, 1961 R. SARDESON 3,001,305
PRESSING IRONS
Filed Jan. 12, 1959 3 Sheets-Sheet 2
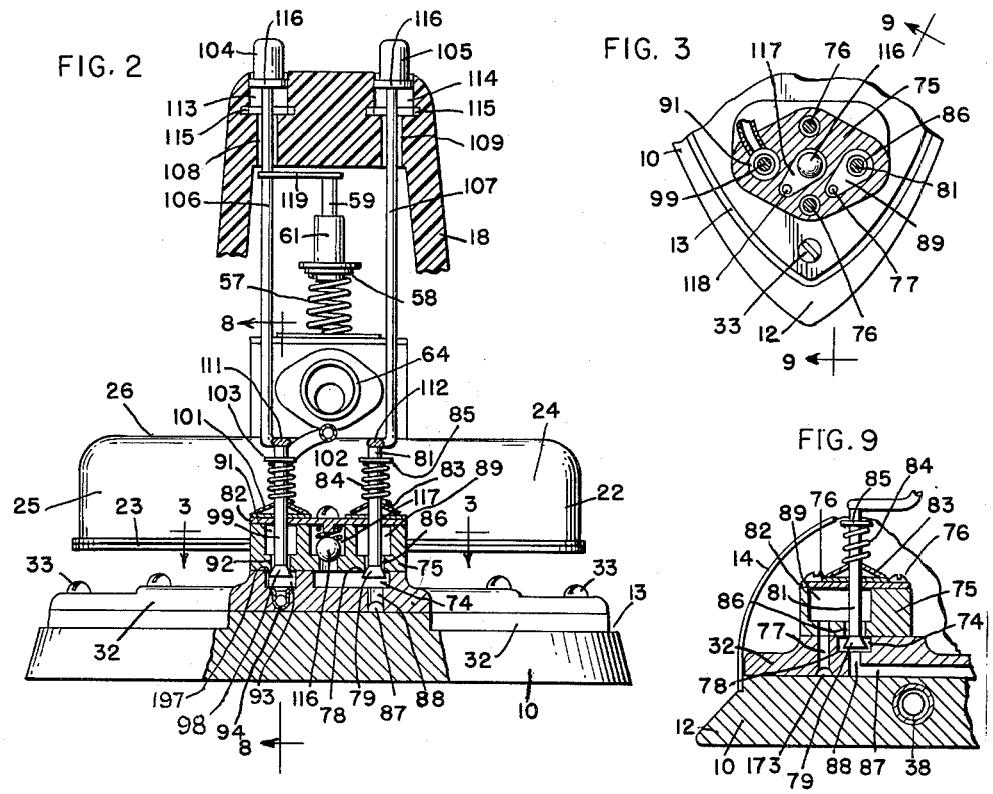
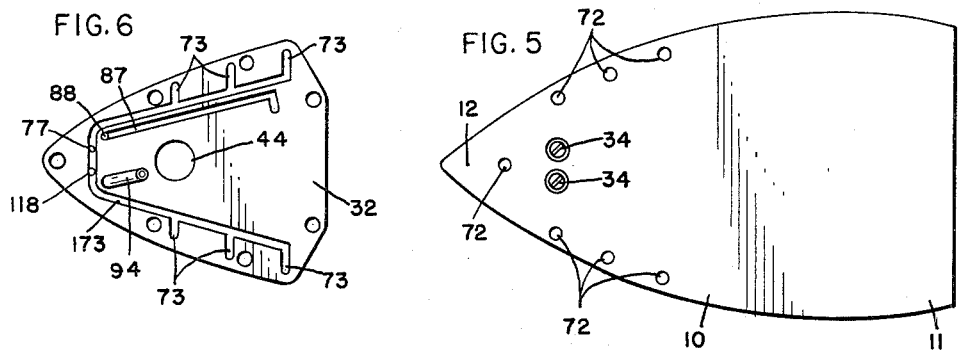
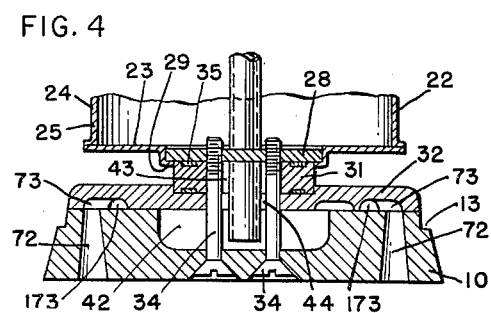
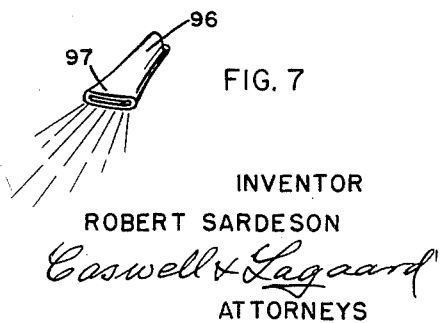
INVENTOR
ROBERT SARDESON
Caswell & Lagaard
ATTORNEYS

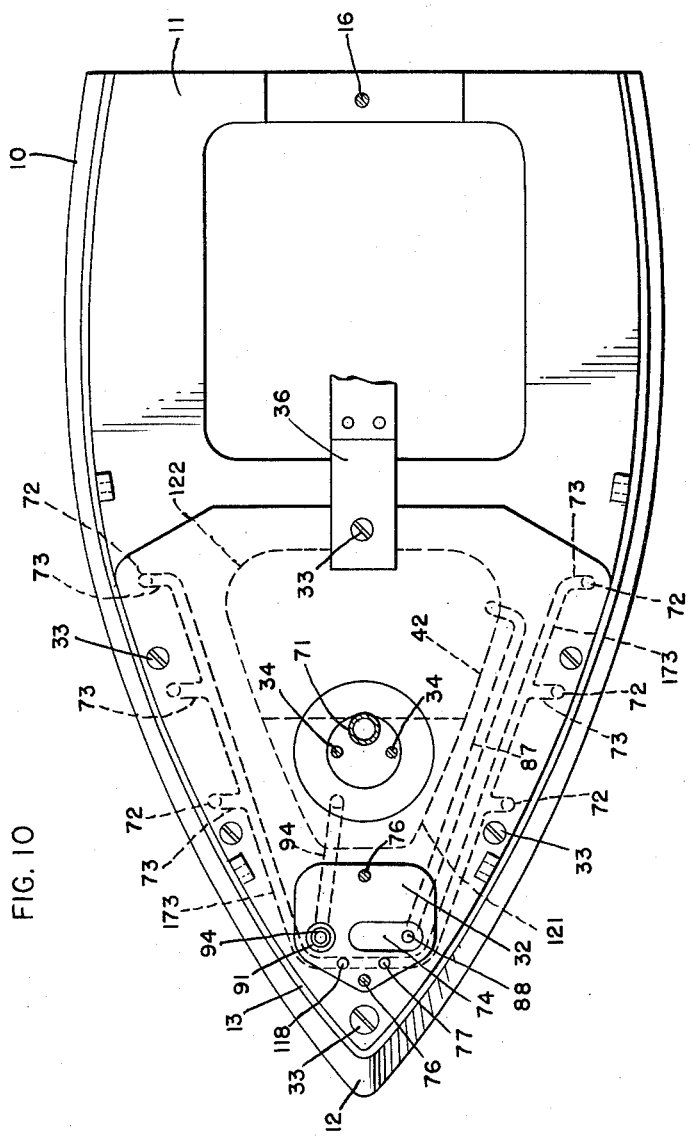

United States Patent Office 3,001,305
Patented Sept. 26, 1961

3,001,305
PRESSING IRONS
Robert Sardeson, R.R. 3, Box 474B, Mound, Minn.
Filed Jan. 12, 1959, Ser. No. 786,154
14 Claims. (Cl. 38—77)

The herein disclosed invention relates to pressing irons and particularly to an iron from which a mixture of water and steam may be sprayed upon the article ironed to dampen the article where the original dampening had dried out.

An object of the invention resides in providing a pressing iron which can be used dry or with steam or with spray or which can be used with both steam and spray.

Another object of the invention resides in providing a construction utilizing a heated sole plate forming a steam generating chamber in which water is injected to create steam and in conducting a portion of the water and steam formed in said chamber to the discharge nozzle for the spray.

A still further object of the invention resides in utilizing a water tank connected to the steam generating chamber through a pressure operated valve whereby the amount of water converted into steam may be controlled in accordance with the consumption of the steam and the spray.

An object of the invention resides in utilizing a diaphragm subject to the steam pressure in the steam generating chamber for operating said valve.

Another object of the invention resides in providing a construction for purging the steam generating chamber of excess water produced by overfilling the water tank.

Another object of the invention resides in utilizing a tube for purging the steam generating chamber which extends from near the bottom of the steam generating chamber to a locality close to the top of the water tank.

A feature of the invention resides in providing a construction by means of which increased water is automatically discharged into the steam generating chamber when the spray is actuated.

Another object of the invention resides in insulating the water tank from the sole plate.

Another object of the invention resides in providing a valve block for controlling the steam and spray directed to the article being ironed and in making the said block removable as a unit.

Other objects of the invention reside in the novel combination and arrangement of parts and in the details of construction hereinafter illustrated and/or described.

In the drawings:

FIG. 1 is a longitudinal elevational sectional view of a pressing iron illustrating an embodiment of the invention.

FIG. 2 is a cross-sectional view taken on line 2—2 of FIG. 1.

FIG. 3 is a fragmentary plan sectional view taken on line 3—3 of FIG. 2.

FIG. 4 is an elevational cross-sectional view taken on line 4—4 of FIG. 1.

FIG. 5 is a bottom view of the sole plate drawn to a reduced scale.

FIG. 6 is an inverted view of the cover plate of the invention and drawn to the same scale as FIG. 5.

FIG. 7 is a perspective view of the spray nozzle of the invention.

FIG. 8 is a fragmentary cross-sectional view taken on line 8—8 of FIG. 2.

FIG. 9 is a view similar to FIG. 8 taken on line 9—9 of FIG. 3.

FIG. 10 is a plan sectional view taken on line 10—10 of FIG. 1.

The invention utilizes a sole plate 10 which is shaped as best shown in FIG. 5 and which is preferably formed as a casting. The sole plate 10 is formed with a heel 11 and a point 12. The said plate is also provided with a rabbet 13 extending about the periphery of the same. Mounted on the sole plate 10 is a case 14 preferably constructed of sheet iron and which has its marginal edge 15 received in the rabbet 13. The case 14 is attached to the sole plate 10 by means of screws, one of which is illustrated in FIG. 1 and indicated by the reference numeral 16. A handle 17 of conventional form is attached to the case 14 and extends above the same as shown in FIG. 1. This handle has a forward upwardly extending post 18 and a similar rearward post 19 with a hand grip 21 connecting the same.

Formed in the upper surface of the sole plate 10 is a cavity 42 which forms in conjunction with the cover 32 a chamber which has been called a steam generating chamber and which is indicated by the same reference numeral. This chamber has a contoured bottom consisting of a lower relatively small zone 121 and a higher somewhat larger zone 122. The reason for this structure will be pointed out in the description of operation.

The sole plate 10 is further formed with ports or apertures 72 and through which steam is directed to the article being ironed. These ports communicate with passageways 73 which in turn communicate with a manifold 173, said passageways and manifold being formed in the cover plate 32.

Disposed within the interior of the case 14 and superimposing and spaced from the sole plate 10 is a water tank 22 having a bottom 23 brazed to a wall structure 24 preferably in the form of a metal stamping. This wall structure includes lateral walls 25 and a top 26. The top 26 is formed with an opening and in which is received a dome 27 extending upwardly from said top and which serves a purpose to be presently described in detail. The bottom 23 of the tank 22 is formed with an opening and in which is received a clamping plate 28. This opening is surrounded by an inturned flange 29 which engages the plate 28 and holds the same in position. The plate 28 may be brazed to the bottom 23 or secured thereto in any other suitable manner. Concentric with the plate 28 is an annular collar 31 which is constructed of porcelain or some similar heat resisting and heat insulating material. This collar overlies a cover plate 32 which rests upon the forward portion of the sole plate 10 and is secured thereto by means of screws 33. Screws 34, best shown in FIGS. 3 and 4, extend through the sole plate 10, through the cover plate 32, the collar 31 and are screwed into the clamping plate 28 to hold the parts connected together. Gaskets 35 may be interposed between the collar 31 and the plate 28 and cover 32 to prevent leakage therebetween.

The uppermost portion of the interior of the dome 27 is connected to the steam generating chamber 42 by means of a tube 71. This tube extends through the plate 28 and the opening 43 in collar 31, the opening 44 in cover 32 and is brazed to said plate, said tube terminating at its lower end near the bottom of the chamber 42.

The sole plate 10 is heated by means of an electric resistance winding 38 which is received in an insulating sleeve 39 inserted in an opening 41 formed in the sole plate 10 and which extends in a U-shaped manner throughout the major portion of said sole plate. This winding is adapted to be energized by the usual electric household current in the customary manner. The said winding may be constructed and installed in accordance with the usual practice and forming no particular feature of the invention has not been shown in detail.

Mounted in the space between the sole plate 10 and the bottom 23 of the water tank 22 is a thermostat 36. This thermostat is provided with a regulating knob 37 and by means of which the temperature of the sole plate may be regulated. This construction forming no particular feature of the invention has not been shown in detail in the drawings.

The collar 31 has a central opening 43 in the same and through which the screws 34 extend. This opening communicates with a similar opening 44 in the cover 32. Formed in the clamping plate 28 is an opening 45 which communicates with the opening 43. The portion of the plate 28 encircling said opening at the bottom thereof and indicated by the reference numeral 46 forms a valve seat. Engageable with the said valve seat is a valve head 47 which is formed on the lower end of a valve stem 48. This valve stem extends upwardly through the dome 27 and is attached to a flexible diaphragm 49 which may be constructed of any suitable flexible material. Diaphragm 49 is clamped to an inturned flange 51 formed on the uppermost portion of the dome 27. Screws 52 extend through a collar 53 overlying said diaphragm and are screwed into the flange 51 to clamp the diaphragm in position. A thin metal washer 54 overlies the diaphragm 49 and is held in position thereon by means of a flanged nut 55 which is attached to said washer and engages the diaphragm on the underside thereof. The washer 54 also partially overlies the collar 53 and limits the downward travel of the diaphragm 49, the valve stem 48 and the valve head 47, whereby it is possible to adjust the maximum opening between the valve head 47 and the valve seat 46 to obtain a predetermined maximum rate of water flow through the opening 45. The nut 55 is threaded to screw on threads 56 formed on the valve stem 48. A compression coil spring 57 engages the washer 54 and also a flange 58 formed on a plunger 59. This plunger is slidably mounted in a bushing 61 which is carried by a bracket 62 secured to the dome 27 by means of certain of the screws 52. A portion of the dome 27, bracket 72, bushing 61 and the plunger 59 are all received in a cavity 63 formed in the post 18 of handle 17.

Filling of the tank 22 with water is accomplished by means of a filler tube 64 which extends through an opening 65 in the post 18 and which extends through the dome 27 and is brazed thereto. The inner end 66 of this tube projects interiorly of the dome 27 and is cut on a bias to form a seat 67 for a flap valve 68 attached to said tube by means of a screw 69. When the iron is set on end, water poured into the tube 64 deflects the valve 68 and enters the interior of the tank 22. When the iron is set in horizontal position, the flap valve 68 closes the end of the tube and is held in closed position through the steam pressure generated within the tank 22 and in the dome 27.

To discharge steam to the article being ironed, a valve block 75 is employed which overlies the cover 32 and is secured thereto by means of screws 76. This valve block has a valve chamber 89 with a passageway 86 leading therefrom. This passageway terminates in a valve seat 78 which is engaged by a valve head 79 mounted on a valve stem 81. Valve stem 81 is guided by a plate 82 overlying the valve block 75 and secured in place thereon by means of screws 76. A gasket 83 encircling said valve stem prevent leakage from the chamber 89. Encircling the valve stem 81 is a compression coil spring 84 which bears against the gasket 83 at one end and a collar 85 at its other end fast on the valve stem 81. Steam is led from the chamber 42 through a horizontal passageway 87 formed on the underside of the cover plate 32. This passageway communicates with a vertical passageway 88 which extends through the cover plate 32 and communicates with the chamber 74 in the upper portion of said cover plate. When the valve stem 81 is depressed, steam passes through the passageway 86 into chamber 89. From this chamber the steam passes through a vertical passageway 77 which communicates with the chamber 89 and extends through the block 75 and the cover plate 32. This passageway 77 further communicates with the manifold 173 which directs the steam to the passageways 73 and is discharged through the ports 72 in sole plate 10 and upon the article being ironed.

A mixture of water and steam may be sprayed upon the article being ironed to sprinkle the same in the event that the article has dried out at the particular locality being ironed. This is accomplished as follows: In the valve block 75 and adjacent the chamber 89 is another valve chamber 91. This valve chamber communicates through a passageway 92 with a chamber 93 formed in the cover 32. Chamber 93 communicates through a bent tube 94 with the steam generating chamber 42, as best shown in FIGS. 1, 2 and 8, the end of said tube lying near the bottom of said chamber. The chamber 91 has connected to it a discharge tube 96 which terminates in a nozzle 97 shown in detail in FIG. 7. This nozzle discharges forwardly over the forward portion of the case 15 and downwardly upon the article being ironed. The lowermost portion of the valve block 75 encircling passageway 92 forms a valve seat 98 adapted to be engaged by a valve head 197. Valve head 197 is mounted on a valve stem 99 guided for movement in the plate 82. The said valve stem passes through a gasket 101, similar to the gasket 83, and is encircled by compression coil spring 102 which is seated at one end against said gasket and at its other end against a collar 103 fast on said valve stem. When the valve stem 99 is depressed, a mixture of steam and water such as occuring in the chamber 42 is directed through the tube 94, into chamber 93, through passageway 92 and into chamber 91 where the same is directed from the valve block 75 through the tube 96 and nozzle 97.

For the purpose of operating the valve stems 81 and 99, two buttons 104 and 105 are employed which are attached to shift rods 106 and 107. These rods are guided for movement in bores 108 and 109 formed in the uppermost portion of the handle 17. The said shift rods have at their ends arms 111 and 112 which are adapted to overlie the ends of the valve stems 99 and 81. The buttons 104 and 105 are slidable in sockets 113 and 114 in the handle 17 and which are formed at the lowermost portions of the same with inwardly extending grooves 115. The said knobs in turn are formed with flanges 116 adapted to enter into the grooves 115. For the purpose, the bores 108 and 109 are made loose enough so that the said buttons can be shifted laterally and the flanges 116 brought into the grooves 115 to lock the said buttons in depressed position so as to maintain the valves controlling the steam and/or the spray open. The rod 106 has attached to it an arm 119 which engages plunger 59 and increases the pressure on spring 57 when button 104 is depressed.

As a safety measure, a safety valve 116 is employed which communicates with the chamber 74 and permits the excess steam to pass into a chamber 117. This chamber communicates through a passageway 118 with the manifold 173 and when steam is escaped the said steam is directed on to the article being ironed through passageways 73. Since the operation of the valve 116 is quite infrequent, and when it does operate only small quantities of steam are released, the operator is generally not aware of the operation of said valve.

The operation of the invention is as follows: The tank 22 is first filled with water by setting the iron on end and by pouring the water into the filler tube 64. When the desired amount of water has been introduced the iron is righted which closes valve 67. The electric plug attached to the cord leading from heater 38 is then plugged into the light socket from which electric current is to be derived. As soon as the iron is righted, water flows through the open passageway 45 controlled by valve head 47. If the steam generating area is sufficiently heated, the formation of steam begins immediately and steam flows upwardly in the tube 71 until the pressure on diaphragm 49 is sufficient to overcome the force of spring 57. Valve head 47 is then closed against the seat 46 and the flow of water from tank 22 to chamber 42 is stopped. In the event that chamber 42 is not yet above the boiling point of water it will be filled with water when the iron is righted. As the temperature rises steam will form and the excess water will be purged upwardly through tube 71 until the water level is even with the bottom of tube 71. Thereafter steam will flow through tube 71 or in the event that water flow through passageway 45 exceeds the ability of chamber 42 to vaporize it, alternately steam and water. While this upward flow is occurring in the tube 71, there may be some small upward flow of steam or water through passageway 45, but the effective area of this passageway is so small in comparison with that of tube 71 that its effect may be disregarded. The steam generating area being freed of excess water, steam pressure is quickly generated and diaphragm 49 and valve head 47 cooperate to stop the further flow of water through passageway 45. Steam generation stops shortly after passageway 45 is closed and the small amount of water in chamber 42 is vaporized. When the button 105 is depressed, the valve head 79 is disengaged from valve seat 78, and the steam contained in chamber 42 passes through the passageways 87 and 88, into chamber 74 and from there through the passageway 86 into chamber 89. From this chamber the steam passes through passageway 77 and into manifold 173 and from said manifold through the passageways 73 where the steam leaves the iron through the ports 72. As soon as the steam commences to flow the pressure in chamber 42 and in the tank 22 drops and the spring 57 overcomes the pressure on diaphragm 49 and disengages valve head 47 from valve seat 46. Water now drips into the chamber 42 and upon the sole plate 10 where it is almost immediately vaporized and steam is continuously generated as long as the button 105 is depressed. As soon as the button 105 is released the pressure in the chamber 42 and tank 22 increases and diaphragm 49 is raised to bring the valve head 47 in engagement with valve seat 46 and terminate the flow of water into chamber 42. When water is required for spraying, the button 104 is depressed and the valve head 98 disengaged from valve seat 197. At the same time the pressure on spring 58 is increased by means of the arm 119 pressing on the end of the plunger 59. This increases the flow of water to the chamber 42 so that the water is only partly turned into steam. A mixture of water and steam now flows through the tube 94, into the chamber 93, through passageway 92 and into chamber 91. From this chamber the mixture flows into the tube 96 from which it is discharged through the nozzle 97. In this manner adequate water is procured to supply the article being ironed as required. Dry steam is available for steaming clothing through the apertures in the sole plate while the steam generating chamber is being fed excess water for spraying because of the previously mentioned contoured bottom of the chamber. The higher area serves to completely vaporize water reaching it and thus permits dry steam to be drawn from the top of the chamber even when there is a vigorously bubbling pool in a lower area. Upon release of the button 104 the spraying ceases. The iron can also be used dry and without either steam or water due to the fact that the tank 22 is insulated from the sole plate 10 through the insulating collar 31. This may be accomplished whether the tank 22 has water in it or whether it is empty.

The advantages of the invention are manifest. The iron can be used as an ordinary iron with or without water in the tank, can be used as a steam iron, and can also be used to spray water for the purpose of sprinkling the article to be ironed. No mixing device is required to mix water and steam as the mixture is already available in the vaporizing chamber and from which it is drawn. The steam pressure is automatically maintained constant and water is admitted only as it is being consumed.

Changes in the specific form of the invention, as herein described, may be made within the scope of what is claimed without departing from the spirit of the invention.

Having described the invention, what is claimed as new and desired to be protected by Letters Patent is:

1. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of a water regulating valve disposed in said water conducting means for controlling the flow of water into said steam generating chamber and having a valve seat and a valve member engageable therewith, and pressure responsive means subject to the pressure in said steam generating chamber connected to and operating said valve member to meter the flow of water into said chamber in accordance with the amount of steam used.

2. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of a water regulating valve disposed in said water conducting means for controlling the flow of water into said steam generating chamber and having a valve seat and a valve member engageable therewith, a dome disposed on the upper portion of said water tank and open at the top, a diaphragm extending across said dome and a valve stem connected to said diaphragm and to said valve member.

3. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of a water regulating valve disposed in said water conducting means for controlling the flow of water into said steam generating chamber and having a valve seat and a valve member engageable therewith, a diaphragm seat carried by said water tank, a diaphragm extending across said seat, clamping means engaging said diaphragm and securing it to said seat, said diaphragm being subject to the pressure in said tank, a conduit mounted in said tank and communicating with the upper portion of said tank and said steam generating chamber, a valve stem connecting said diaphragm to said valve head and urging the valve head into closing position by means of the steam pressure on the diaphragm, and resilient means acting between said diaphragm and a part fixed relative to said tank and urging said valve stem into valve opening position.

4. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of adjustable pressure responsive water flow control means in said water conducting means and responsive to the pressure in said steam generating chamber.

5. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of a water regulating valve disposed in said water conducting means for controlling the flow of water into said steam generating chamber and having a valve seat and a valve member engageable therewith, a pressure responsive device including a diaphragm and having a chamber adjacent one side thereof, in communication with said steam generating chamber, said pressure responsive device further including resilient means acting against said diaphragm on the other side thereof, means connected to said diaphragm and said valve member for opening the same through the pressure of the spring and closing the same through the steam pressure.

6. In a pressing iron having a sole plate, heating means supported by and in heat transfer relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of adjustable pressure responsive water flow control means in said water conducting means and responsive to the pressure in said steam generating chamber, a spray nozzle, steam and water conducting means connected to said nozzle and communicating with said flash steam generating chamber, and manually controlled valve means in said last named means.

7. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of adjustable pressure responsive water flow control means in said water conducting means and responsive to the pressure in said steam generating chamber, a spray nozzle, steam and water conducting means connected to said nozzle and communicating with said steam generating chamber, manually controlled valve means in said last named means, and adjusting means operated manually controlled valve means and connected to and adjusting said pressure responsive water control means to increase the rate of flow of water into the steam generating chamber upon opening of said last named valve means.

8. In a pressing iron having a sole plate, heating means supported by and in heat transfer relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate, water conducting means connected to said water tank and communicating with said steam generating chamber, the combination of a water regulating valve disposed in said water conducting means for controlling the flow of water into said steam generating chamber and having a valve seat and a valve member engageable therewith, a diaphragm seat carried by said water tank, a diaphragm extending across said seat, clamping means engaging said diaphragm and securing it to said seat, said diaphragm being subject to the pressure in said tank, a conduit mounted in said tank and communicating with the upper portion of said tank and said steam generating chamber, a valve stem connecting said diaphragm to said valve head and urging the valve head into closing position by means of the steam pressure on the diaphragm, resilient means acting between said diaphragm and a part fixed relative to said tank and urging said valve stem into valve opening position, a spray nozzle, steam and water conducting means connected to said nozzle and communicating with said steam generating chamber, manually controlled valve means in said last named means, and adjusting means operated by said second named valve means and engaging said resilient means to increase the pressure exerted by the same to increase the flow of water to said steam generating chamber when said second named valve means is opened.

9. In combination, a pressing iron having a sole plate, heating means supported by and in heat conducting relation with reference to said sole plate, means forming a steam generating chamber receiving heat from said heater, delivery means connected to said steam generating chamber and delivering steam to the work, a water tank disposed above said sole plate, water conducting means connected to said water tank and communicating with said steam generating chamber, a water regulating valve disposed in said water conducting means for controlling the flow of water into said steam generating chamber and having a fixed valve member and a movable valve member cooperating therewith, pressure responsive means including a flexible wall forming a part of the wall structure of said tank and subject to the pressure in said steam generating chamber connected to and operating said valve member to meter the flow of water into said chamber in accordance with the amount of steam used.

10. In combination, a pressing iron having a sole plate, heating means supported by and in heat conducting relation with reference to said sole plate, means forming a steam generating chamber carried by and disposed in heat conducting relation with reference to said sole plate, delivery means connected to said steam generating chamber and delivering steam to the work, a water tank disposed above said sole plate, water conducting means connected to said water tank and communicating with said steam generating chamber, a water regulating valve disposed in said water conducting means for controlling the flow of water into said steam generating chamber and having a fixed valve member and a movable valve member cooperating therewith, pressure responsive means subject to the pressure in said steam generating chamber connected to and operating said movable valve member to meter the flow of water into said chamber in accordance with the amount of steam used, and means forming a vent extending from the bottom of the steam generating chamber to the top of the tank.

11. In a pressing iron having a sole plate, heating means supported by and in heat conducting relation with reference to said sole plate, means forming a steam generating chamber receiving heat from said heater, steam delivery means connected to said steam generating chamber and delivering steam to the work, manually controlled valve means in said steam delivery means, a water tank disposed above said sole plate and having a top and a bottom, the combination of a dome on the top of said tank, said dome having an opening at the lower portion of the same and communicating with the interior of the tank, a diaphragm extending across the top of the dome and forming the upper wall thereof, the bottom of said tank having a water conducting opening therethrough, a valve seat encircling said opening, water conducting means extending between said steam generating chamber and communicating with the opening in the bottom of said tank, a valve stem attached to said diaphragm and extending through the opening in said bottom, a valve member carried by said valve stem and engageable with said valve seat upon increase of pressure in said boiler beyond a certain degree, said valve stem extending upwardly beyond said diaphragm, resilient means acting between said valve stem and a part fixed relative to said tank to urge the valve member into closing position, manually controlled means engaging said valve stem for operating said valve member, a vent communicating directly with said flash steam generator on the pressure side of said valve means in said steam delivery means and with the interior of said dome, a filler tube connected to said dome and communicating with the interior thereof and a gravity operated closure for said filler tube occupying a closing position when the iron is in ironing position to maintain pressure within said tank and in open position when the iron is stood on end.

12. In a pressing iron having a sole plate, heating means supported by and in heat conducting relation with reference to said sole plate, said sole plate having a cavity therein, a cover for said cavity attached to said sole plate and forming with said cavity a steam generating chamber, means for feeding water to said chamber, a block overlying and attached to said cover, a steam delivery valve mounted in and carried by said block, a spray valve mounted in and carried by said block, a safety valve mounted in and carried by said block, said sole plate, cover and block being formed with passageways leading to said valves, said sole plate having steam discharge ports therein, said sole plate, cover and block having passageways communicating with said ports and steam valve, a spray nozzle, means forming a passageway between said spray nozzle and spray valve and means for detachably securing said block in overlying position on said cover.

13. In combination, a pressing iron having a sole plate, heating means in heat transfer relation with reference to said sole plate, means forming a steam generating chamber receiving heat from said heating means, water conducting means having an inlet communicating with and feeding water to said steam generating chamber, said chamber having a zone disposed in proximity to and receiving water from said water inlet and producing a mixture of water and steam, and a dry steam producing zone removed from said water inlet, distributing means connected to said steam generating chamber at the locality of said first named zone and delivering a mixture of water and steam to the work, separate delivery means connected to said steam generating chamber at the locality of said second named zone and delivering dry steam to the work, and control means for selectively controlling the flow of dry steam and the mixture of water and steam.

14. In combination, a pressing iron having a sole plate, heating means in heat transfer relation with reference to said sole plate, means forming a steam generating chamber receiving heat from said heating means, water conducting means having an inlet communicating with and feeding water to said steam generating chamber, said chamber having a zone disposed in proximity to and receiving water from said water inlet and producing a mixture of water and steam, and a dry steam producing zone removed from said water inlet, distributing means connected to said steam generating chamber at the locality of said first named zone and delivering a mixture of water and steam to the work, separate delivery means connected to said steam generating chamber at the locality of said second named zone and delivering dry steam to the work, control means for selectively controlling the flow of dry steam and the mixture of water and steam, and metering means for selectively metering the flow of water to said steam generating chamber.

References Cited in the file of this patent
UNITED STATES PATENTS

| | | |
|---|---|---|
| 1,917,698 | Carson | July 11, 1933 |
| 2,049,652 | Jolley | Aug. 4, 1936 |
| 2,387,757 | Hoecker | Oct. 30, 1945 |
| 2,520,360 | Clark | Aug. 29, 1950 |
| 2,781,776 | Gratzmuller | Feb. 19, 1957 |
| 2,802,289 | Hoecker | Aug. 13, 1957 |
| 2,861,363 | Finlayson | Nov. 25, 1958 |

Notice of Adverse Decision in Interference

In Interference No. 93,266 involving Patent No. 3,001,305, R. Sardeson, PRESSING IRONS, final judgment adverse to the patentee was rendered Jan. 4, 1965, as to claim 9.

[*Official Gazette February 23, 1965.*]